US012230138B2

(12) United States Patent
Murphy et al.

(10) Patent No.: US 12,230,138 B2
(45) Date of Patent: Feb. 18, 2025

(54) MINE COLLISION DETECTION AND AVOIDANCE

(71) Applicants: SANDVIK MINING AND CONSTRUCTION OY, Tampere, FL (US); NEWTRAX TECHNOLOGIES INC., Montreal (CA)

(72) Inventors: Patrick Murphy, Tampere (FI); Alexandre Cervinka, Montreal (CA); Petri Mannonen, Tampere (FI); Pekka Martikainen, Tampere (FI)

(73) Assignees: SANDVIK MINING AND CONSTRUCTION OY, Tampere (FI); NEWTRAX TECHNOLOGIES INC., Montreal (CA)

( * ) Notice: Subject to any disclaimer, the term of this patent is extended or adjusted under 35 U.S.C. 154(b) by 248 days.

(21) Appl. No.: 17/362,307

(22) Filed: Jun. 29, 2021

(65) Prior Publication Data
US 2021/0407298 A1 Dec. 30, 2021

Related U.S. Application Data

(60) Provisional application No. 63/046,056, filed on Jun. 30, 2020.

(51) Int. Cl.
G08G 1/16 (2006.01)
G05D 1/00 (2024.01)
(Continued)

(52) U.S. Cl.
CPC .......... *G08G 1/164* (2013.01); *G05D 1/0044* (2013.01); *G05D 1/0289* (2013.01); *G06Q 50/02* (2013.01); *G08G 1/205* (2013.01)

(58) Field of Classification Search
CPC ........ G08G 1/164; G08G 1/205; G08G 1/166; G05D 1/0044; G05D 1/0289;
(Continued)

(56) References Cited

U.S. PATENT DOCUMENTS 9,797,247 B1 * 10/2017 Nelson ................... G05D 1/024
2008/0082347 A1 * 4/2008 Villalobos .............. G06Q 50/40
705/305

(Continued)

FOREIGN PATENT DOCUMENTS

WO 2014056099 A1 4/2014

*Primary Examiner* — Jason Holloway
*Assistant Examiner* — Madison B Emmett
(74) *Attorney, Agent, or Firm* — Corinne R. Gorski

(57) ABSTRACT

There is provided a method including the steps of receiving mine operations data from a set of data sources in a mine, the mine operations data, processing the mine operations data to detect a set of events meeting at least one operator attention triggering condition, mapping the set of events to a mine model on the basis of location information associated with the events in the set of events, determining an affected location area of the set of events mapped to the mine model, and generating an operator attention indicator dependent on density of events in the affected location area for display for the set of events in the affected location area in the mine model to an operator to adjust operation of one or more mine operations devices.

15 Claims, 8 Drawing Sheets

(51) Int. Cl.
 *G06Q 50/02* (2024.01)
 *G08G 1/00* (2006.01)
(58) Field of Classification Search
 CPC ............. G05D 2201/021; G06Q 50/02; G01C 21/3697; G01C 21/38
 See application file for complete search history.

(56) References Cited

U.S. PATENT DOCUMENTS

| | | | |
|---|---|---|---|
| 2008/0137589 A1* | 6/2008 | Barrett | H04W 4/33 |
| | | | 370/327 |
| 2011/0153117 A1* | 6/2011 | Koch | G05D 1/0274 |
| | | | 701/2 |
| 2011/0295496 A1 | 12/2011 | Petrie et al. | |
| 2012/0127924 A1* | 5/2012 | Bandyopadhyay | G08G 1/16 |
| | | | 370/328 |
| 2013/0342338 A1* | 12/2013 | Green | B60W 30/095 |
| | | | 340/438 |
| 2014/0184643 A1* | 7/2014 | Friend | G09G 3/003 |
| | | | 345/633 |
| 2014/0310633 A1* | 10/2014 | McLellan | E21B 43/30 |
| | | | 715/771 |
| 2015/0091716 A1* | 4/2015 | Hathaway | G01S 7/003 |
| | | | 340/435 |
| 2015/0199106 A1* | 7/2015 | Johnson | G06F 3/011 |
| | | | 715/740 |
| 2015/0254985 A1* | 9/2015 | Fisher | B60K 28/10 |
| | | | 348/148 |
| 2017/0131115 A1* | 5/2017 | Park | G01C 21/3697 |
| 2018/0101612 A1* | 4/2018 | Rosztoczy | G06F 16/29 |
| 2019/0244023 A1* | 8/2019 | Havnør | G06V 20/58 |
| 2020/0074383 A1* | 3/2020 | Smith | G06Q 10/063114 |
| 2020/0110417 A1* | 4/2020 | Utter | E02F 9/2045 |
| 2024/0026776 A1* | 1/2024 | Raina | G06F 16/906 |

* cited by examiner

MINE COLLISION DETECTION AND AVOIDANCE

RELATED APPLICATION DATA

This application claims priority of U.S. Provisional Application No. 63/046,056, filed Jun. 30, 2020, which the entirety thereof is incorporated herein by reference.

TECHNICAL FIELD

The present disclosure relates to analysing, monitoring and controlling of mine operations.

BACKGROUND

Mines, such as hard rock or soft rock mines, typically include a variety of operation zones intended to be accessed by different types of mobile work machines, such as load and/or haul machines and drilling rigs. A mobile work machine may be an unmanned, e.g. remotely controlled from a control room, or a manned work machine, i.e. operated by an operator sitting in a cabin of the work machine. Mobile work machines may be autonomously operating, i.e. automated or semi-automated work machines, which in their normal operating mode operate independently without external control, but which may be taken under external control at certain operation areas or conditions, such as during states of emergencies.

A mine may include large number of mobile and fixed sensors continuously collecting data related to or affecting operations in the mine operations. Such data may be referred to as mining operations data and include work machine operations status data (e.g. speed, motor parameter, load, etc.) and/or tunnel environment data (e.g. temperature, air condition etc.), for example. The data may be transferred to a data processing system, which may be configured to provide a mine operations control system, comprising a user interface for a user of the system, which may be referred to as an operator. Mines may be very large and complex with a large number of simultaneously operating mobile work machines. Very large amount of information may need to be provided in the user interface simultaneously, particularly in problem situations.

SUMMARY

There is provided a collision detection and avoidance system for a mine, including means configured for performing the steps of receiving mine operations data from a set of data sources in the mine, the mine operations data comprising collision detection and avoidance data related to mining vehicles, processing the mine operations data to detect a set of collision detection and avoidance events meeting at least one operator attention triggering condition, mapping the set of collision detection and avoidance events to a mine model on the basis of location information associated with the collision detection and avoidance events in the set of collision detection and avoidance events, determining an affected location area of the set of collision detection and avoidance events mapped to the mine model, generating, on the basis of the set of collision detection and avoidance events and the affected location area, an operator attention indicator dependent on density of collision detection and avoidance events in the affected location area, and controlling display of the operator attention indicator for the set of collision detection and avoidance events in the affected location area in the mine model to an operator to adjust operation of one or more mine operations devices.

The operation attention indicator may be arranged to be generated based on criticalities of collision detection and avoidance events in the affected location area. The operation attention indicator may be arranged to be generated based on distances of proximity of collision detection and avoidance events in the affected location area. Location data related to a collision detection and avoidance unit may be received, and the display of at least one operator guidance element associated with at least some of the events in the set of events may be caused in response to determining that the collision detection and avoidance unit is in the affected location area. Location data related to a collision detection and avoidance unit may be received, and output may be caused by a collision detection and avoidance unit of at least one operator guidance element associated with at least some of the events in the set of events in response to determining that the collision detection and avoidance unit is in the affected location area.

There is provided an apparatus including means configured for performing the steps of receiving mine operations data from a set of data sources in a mine, the mine operations data including sensor data, processing the mine operations data to detect a set of events meeting at least one operator attention triggering condition, mapping the set of events to a mine model on the basis of location information associated with the events in the set of events, determining an affected location area of the set of events mapped to the mine model, generating, on the basis of the set of events and the affected location area, an operator attention indicator dependent on density of events in the affected location area, and controlling display of the operator attention indicator for the set of events in the affected location area in the mine model to an operator to adjust operation of one or more mine operations devices.

There is provided a collision detection and avoidance method including receiving mine operations data from a set of data sources in a mine, the mine operations data having collision detection and avoidance data, processing the mine operations data to detect a set of collision detection and avoidance events meeting at least one operator attention triggering condition, mapping the set of collision detection and avoidance events to a mine model on the basis of location information associated with the events in the set of collision detection and avoidance events, determining an affected location area of the set of collision detection and avoidance events mapped to the mine model, generating, on the basis of the set of events and the affected location area, an operator attention indicator dependent on density of collision detection and avoidance events in the affected location area, and controlling display of the operator attention indicator for the set of collision detection and avoidance events in the affected location area in the mine model to an operator to adjust operation of one or more mine operations devices.

The operation attention indicator may be arranged to be generated based on criticalities of collision detection and avoidance events in the affected location area. The operation attention indicator may be arranged to be generated based on distances of proximity of collision detection and avoidance events in the affected location area. Location data related to a collision detection and avoidance unit may be received, and display of at least one operator guidance element associated with at least some of the events in the set of events may be caused in response to determining that the collision detection and avoidance unit is in the affected location area. Location data related to a collision detection and avoidance unit may be received, and output may be caused by a collision detection and avoidance unit of at least one operator guidance element associated with at least some of the events in the set of events in response to determining that the collision detection and avoidance unit is in the affected location area.

There is provided a method for facilitating mine operations analysis and control, including receiving mine operations data from a set of data sources in a mine, the mine operations data including sensor data, processing the mine operations data to detect a set of events meeting at least one operator attention triggering condition, mapping the set of events to a mine model on the basis of location information associated with the events in the set of events, determining an affected location area of the set of events mapped to the mine model, generating, on the basis of the set of events and the affected location area, an operator attention indicator dependent on density of events in the affected location area, and controlling display of the operator attention indicator for the set of events in the affected location area in the mine model to an operator to adjust operation of one or more mine operations devices. Embodiments of the method include various embodiments of the apparatus of the first aspect.

There is provided an apparatus including at least one processing core, at least one memory including computer program code, the at least one memory and the computer program code being configured to, with the at least one processing core, cause the apparatus at least for performing: receiving mine operations data from a set of data sources in a mine, the mine operations data comprising sensor data, processing the mine operations data to detect a set of events meeting at least one operator attention triggering condition, mapping the set of events to a mine model on the basis of location information associated with the events in the set of events, determining an affected location area of the set of events mapped to the mine model, generating, on the basis of the set of events and the affected location area, an operator attention indicator dependent on density of events in the affected location area, and controlling display of the operator attention indicator for the set of events in the affected location area in the mine model to an operator to adjust operation of one or more mine operations devices.

There is provided an apparatus including at least one processing core, at least one memory including computer program code, the at least one memory and the computer program code being configured to, with the at least one processing core, cause the apparatus at least for performing: receiving mine operations data from a set of data sources in the mine, the mine operations data comprising collision detection and avoidance data related to mining vehicles, processing the mine operations data to detect a set of collision detection and avoidance events meeting at least one operator attention triggering condition, mapping the set of collision detection and avoidance events to a mine model on the basis of location information associated with the collision detection and avoidance events in the set of collision detection and avoidance events, determining an affected location area of the set of collision detection and avoidance events mapped to the mine model, generating, on the basis of the set of collision detection and avoidance events and the affected location area, an operator attention indicator dependent on density of collision detection and avoidance events in the affected location area, and controlling display of the operator attention indicator for the set of collision detection and avoidance events in the affected location area in the mine model to an operator to adjust operation of one or more mine operations devices.

The operation attention indicator may be arranged to be generated based on criticalities of collision detection and avoidance events in the affected location area. The operation attention indicator may be arranged to be generated based on distances of proximity of collision detection and avoidance events in the affected location area. Location data related to a collision detection and avoidance unit may be received, and display of at least one operator guidance element associated with at least some of the events in the set of events may be caused in response to determining that the collision detection and avoidance unit is in the affected location area. Location data related to a collision detection and avoidance unit may be received, and output may be caused by a collision detection and avoidance unit of at least one operator guidance element associated with at least some of the events in the set of events in response to determining that the collision detection and avoidance unit is in the affected location area.

There is provided a computer program, a computer program product or computer-readable medium including computer program code for, when executed in a data processing apparatus, to cause the apparatus to perform the method or an embodiment thereof.

An apparatus, method, system and/or computer program may further include processing at least some events in the set of events by a corrective action module to detect at least one corrective action to address at least some of events in the set of events, determining one or more mine operations devices and one or more control commands associated with the corrective action, and causing transmission of control signals associated with the one or more control commands to the determined one or more mine operations devices in response to detecting an imperative condition for automatic control, or generating an operator guidance element indicative of the determined one or more mine operations devices and the one or more control commands.

Coloring in the affected location area may be controlled on the basis of the density of the set of data events and/or a set of parameter values of the set of events in the affected location area.

An apparatus, method, system and/or computer program may further include determining heat values for a tunnel point for each event in the set of events within the second radius from the tunnel point, determining a heat sum for the tunnel point by summing the heat values, defining color for the tunnel point on the basis of the heat sum, and controlling coloring of the tunnel point by the defined color in the three-dimensional representation.

The affected location area may be dependent on the number of events in the set of events.

An apparatus, method, system and/or computer program may further include receiving an indication of operator-selected time instant or time range and processing time stamps of the event data to detect the set of events matching with the operator-selected time instant or time range.

An apparatus, method, system and/or computer program may further include defining a parameter value of a data source or a set of data sources, and assigning a color associated with a range of values comprising the parameter value for visualization of the data source or the set of data sources data.

An apparatus, method, system and/or computer program may further include defining number of events and/or data sources within the affected area or a sub-area of the affected area, and adapting brightness of visualization of the area on the basis of the number of events and/or data sources.

The apparatus may be a server or part of a control system configured to visualize the at least one monitored feature on at least one display device.

The foregoing summary, as well as the following detailed description of the embodiments, will be better understood when read in conjunction with the appended drawings. It should be understood that the embodiments depicted are not limited to the precise arrangements and instrumentalities shown.

DETAILED DESCRIPTION

Figure 1A:
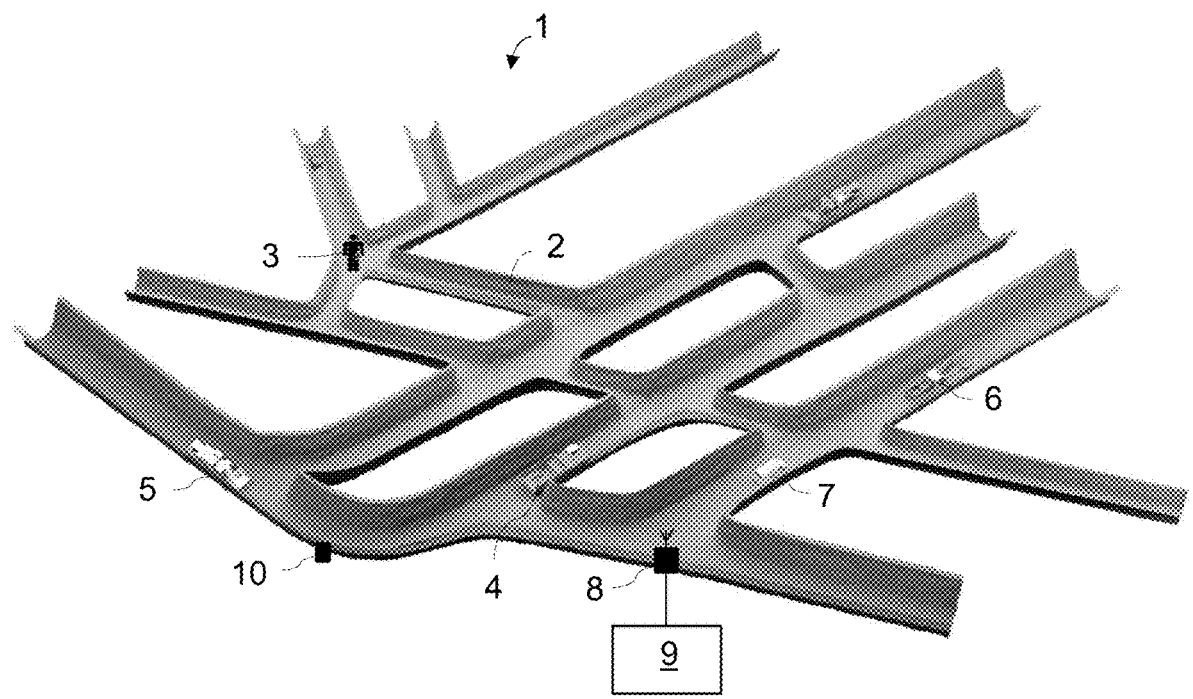
FIGS. 1a and 1b illustrate examples of an underground mine with a mine operations analytics and monitoring system having a collision detection and avoidance system.

FIG. 1a illustrates a simplified example of a mine 1, in the present example an underground mine having a network 2 of underground tunnels. A plurality of mobile objects, such as persons or pedestrians 3 and/or mobile work machines 4, 5, 6, 7 may be present in and move between different areas or operation zones of the worksite 1.

The term "mine" herein is intended to include a variety of underground or surface excavation worksites. The term "mobile work machine" herein refers generally to mobile work machines suitable to be used in mine operations, such as lorries, dumpers, vans, mobile rock drilling or cutting rigs, mobile reinforcement machines, and bucket loaders. The mobile work machines may be autonomously operating mobile work machines, which herein refers to automated or semi-automated mobile work machines.

The worksite 1 includes a communications system, such as a wireless access system having a wireless local area network (WLAN), including a plurality of wireless access nodes 8. The access nodes 8 may communicate with wireless communications units included by the work machines or carried by the pedestrians and with further communications devices (not shown), such as network device(s) configured to facilitate communications with an on-site (underground or above-ground) and/or remote control system 9.

The worksite 1 may further include various other types of mine operations devices 10 connectable to the control system 9 e.g. via the access node 8, not further illustrated in FIG. 1. Examples of such further mine operations devices 10 include various devices for power supply, ventilation, air condition analysis, safety, communications, and other automation devices. For example, the worksite may include a passage control system with passage control units (PCU) separating operation zones, some of which may be set-up for autonomously operating work machines. The passage control system and associated PCUs may be configured to allow or prevent movement of one or more work machines and/or pedestrians between zones.

Mine operations devices may be autonomous, they may be controlled by a human operator or they may be remote-controlled. The mine operations devices may be part of or be connected to a mine operations analysis and control system such as a system for collision detection and avoidance, and the system may be operating automatically without human intervention or it may be monitored or controlled by a human operator. In this manner, an operator may be understood to be an operator of the mine operations analysis and control system. An operator may also be understood to be an operator of equipment, work machines and vehicles, as well as any units connected to the control system or being part of the control system.

The mine operations devices such as automation devices and collision detection and avoidance units for vehicles and personnel as well as the mine work machines may include elements and modules for determining the location of the device, unit or vehicle. The location of mobile equipment may be determined with positioning technologies based on reading the nearest location markers, which can be the nearest Wi-Fi hot spot, EPC tag, BLE tag or a LIDAR based positioning system. Personnel location can be determined with similar technologies in personnel units. Positioning based on the mine network base station identification, signal strength and flight time measurements as well as positioning systems like the Global Positioning System GPS for surface mines and various in-door positioning technologies may also be used. Such a location determined by any location technology may be mapped to the mine model and consequently used as described in the present description.

Figure 1B:
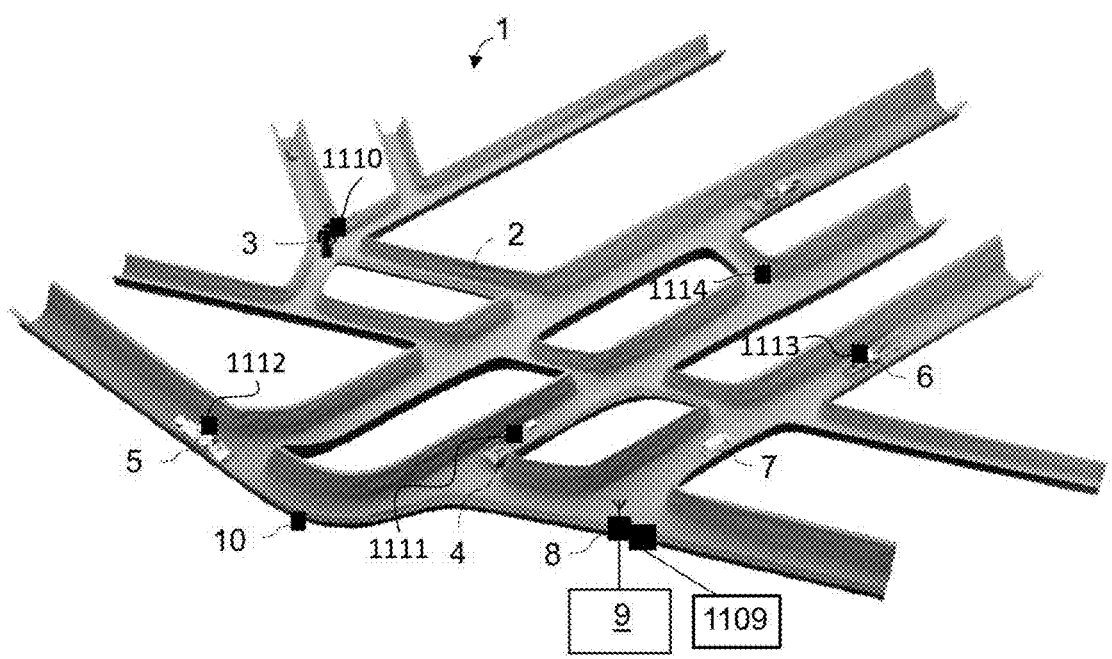

FIG. 1b illustrates a mine with a collision detection and avoidance system. The worksite 1 may include a system 1109 for collision detection or collision avoidance, either as a standalone system, connected to other systems in the mine, or as a sub-system of one or more other systems in the mine, for example a scheduling system or the mine operations control system 9. The collision detection system 1109 may include collision detection and collision avoidance units 1110, 1111 for personnel, 1112, 1113 for vehicles and 1114 for objects. In other words, a mine operations system 9 may include a collision detection and avoidance system 1109 and a mine operations device 10 may include a collision detection and avoidance device 1110, 1111, 1112, 1113, 1114. A collision avoidance detection and avoidance system is understood as a system and devices that are capable of detecting proximity between vehicles, personnel and/or objects and that may include functionalities like alarming people of a possibility of a collision, or detecting and analyzing the distances between vehicles and between vehicles and people, or providing information and/or control commands for controlling vehicles to avoid a collision, e.g. by way of slowing down or stopping a vehicle by controlling the acceleration or braking functions of a vehicle.

A collision detection and avoidance system may be implemented as a server, vehicle collision detection and avoidance units and personnel collision detection and avoidance units all connected to the communications system. The vehicle and personnel collision detection and avoidance units may communicate directly with each other to determine the distance between the units. For example, a vehicle collision detection and avoidance unit may communicate with a personnel collision detection and avoidance unit and determine the distance of the personnel collision detection and avoidance unit using a time-of-flight method or another method for measuring distance. There may be a plurality of collision detection and avoidance sensors on a vehicle, and this may enable the direction of the other collision detection and avoidance units to be determined with respect to the vehicle collision detection and avoidance unit. The collision detection and avoidance units may have predetermined proximity distance thresholds to determine the criticality of the proximity, e.g. a safe distance threshold, a hazardous distance threshold and a critically hazardous distance threshold. The personnel collision detection and avoidance units may be integrated to other personnel safety equipment, e.g. a cap lamp. The personnel collision detection and avoidance unit may have a button or other means to cause a collision detection and avoidance alarm.

Figure 2A:
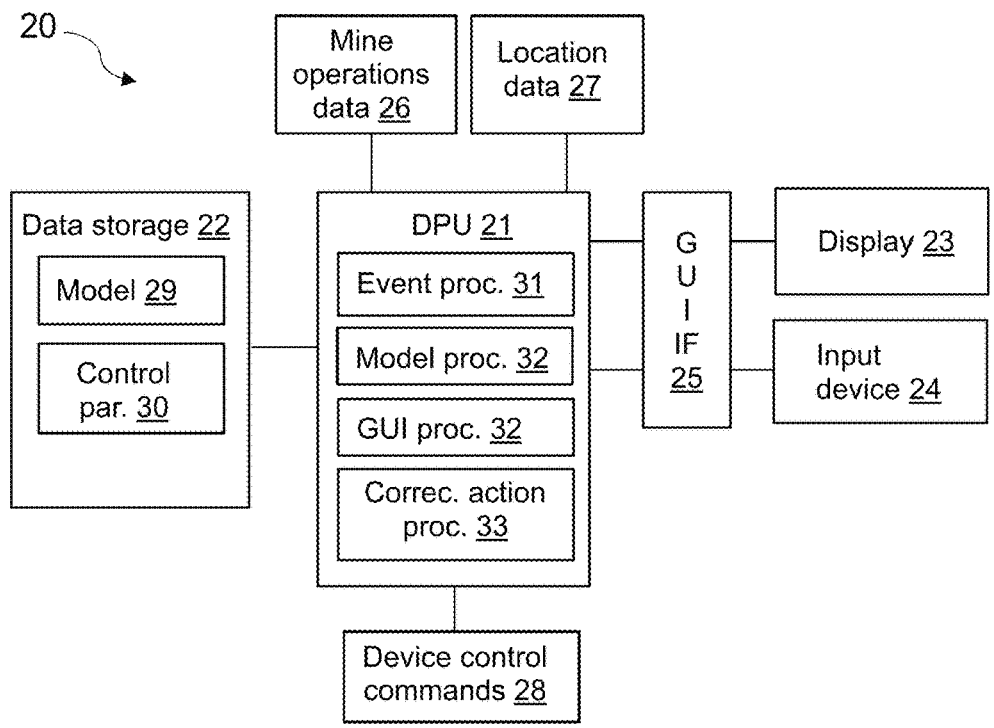
FIGS. 2a and 2b illustrate a mine operations analytics and monitoring system with a collision detection and avoidance system.
Figure 2B:
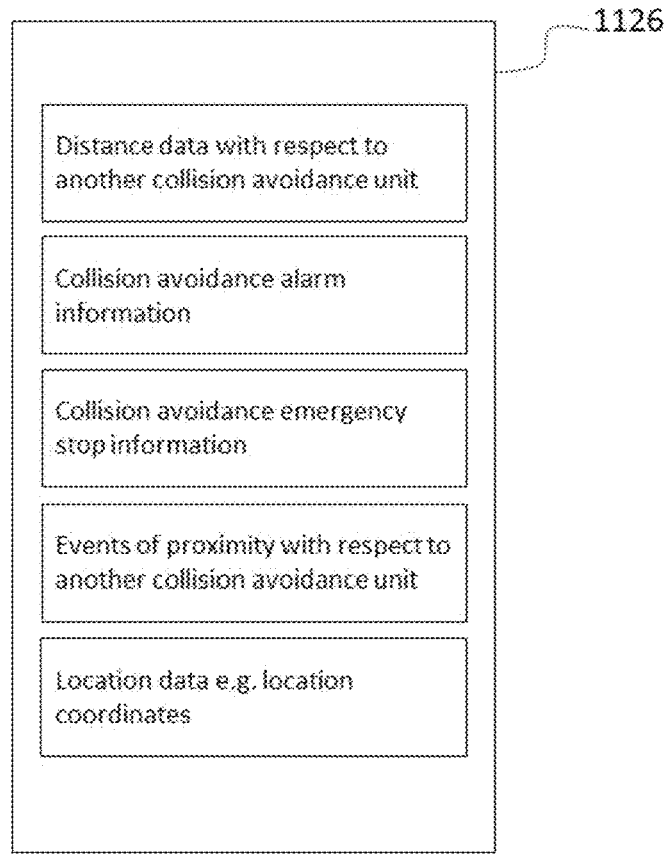

FIGS. 2a and 2b illustrate block diagrams of some logical components of a mine operations analytics and monitoring system or apparatus 20 according to an example. A data processing unit (DPU) 21 receives mine operations data 26 from a set of data sources in a mine, such as the mobile objects 3-7 or other types of mine operations devices 10 illustrated in FIG. 1. The mine operations data may include sensor data, but it is to be appreciated that the mine operations data may include various other type of data, such as operating parameter data. The mine operations data may be indicative of mine operations performance, work machine parameters, performance and/or analytics data, for example. The mine operations data may include alarm data of one or more of a connectivity alarm, a safety device alarm, a vehicle alarm. For example, the data source is a sensor, a set of sensors, or a control unit or system configured to receive inputs from a set of sensors included by an underground vehicle.

The mine operations data may include data 1126 related to collision detection and avoidance. For example, the mine operations data may include collision detection sensor data, analysis results from collision detection and avoidance, and collision alarms and events created or received by various collision detection and avoidance units.

The collision detection and avoidance data may include distance data with respect to another collision avoidance unit, indicating the proximity distance between two vehicles or a vehicle and a person, for example. The collision detection and avoidance data may include information on any collision avoidance alarms, for example automatically created alarms and manually created alarms. The collision detection and avoidance data may include information about emergency stop events caused by the collision avoidance, or deceleration or braking data.

The collision detection and avoidance data may include information about events of proximity with respect to another collision avoidance unit, e.g. information if the proximity has been closer than a predetermined proximity distance. The collision detection and avoidance data may include location coordinates, e.g. relative to the mine model and associated with any of such events and data. These collision detection and avoidance data 1126 can be sent from the individual collision detection and avoidance units 1110, 1111, 1112, 1113, 1114.

The DPU 21 also receives location data 27 from at least some of the data sources. It is to be noted that the location data 27 may be received together with the associated mine operations data 26. The DPU 21 or a positioning module (not shown) connected to the DPU 21 determines the locations of the data sources on the basis of identification data and/or positioning data from the respective data source. The collision detection and avoidance system 1109 and the collision detection and avoidance units 1110, 1111, 1112, 1113, 1114 may include positioning hardware and software for them to determine their position and to send that as location data 27. This location data 27 may be formed and sent separately, simultaneously or as part of the collision detection and avoidance data 1126.

The DPU 21 may also be configured to receive the mine model 29 and control parameters 30 stored in a data storage 22, such as one or more internal or external memories or databases. The control parameters may control at least some operations of the DPU 21 illustrated below, and include threshold values and other parameter values, for example. The DPU 21 may be configured to perform an event processing module 31, which may generate and/or detect events on the basis of the mine operations data 26, and further process the events as illustrated further below. A model processing module 32 may process the mine model 29 and map events and/or mobile objects to the model on the basis of location data associated with respective events and mobile objects. A GUI processing module 32 may generate or at least control GUI displayed to an operator by a display 23 via a GUI interface 25. The DPU 21 may further receive operator input from an input device 24 via the GUI IF 25.

The DPU 21 may further include a corrective action processing module (CAPM) 33 configured to define corrective action(s) on the basis of the events. The DPM 21 may include control command functionality for generating and/or causing control commands 28 to mine operations devices 4-8, 10, which may be a specific module or part of the CAPM 33. It will be appreciated that the system or apparatus 20 may include various further units or devices not illustrated in FIG. 2, such as one or more communications device to transmit and receive the data 26, 27 and commands 28.

There may be a plurality of mine operations analytics apparatuses connected and/or providing data or events to the mine operations analytics system. For example, persons working in the mine may carry collision avoidance devices. Such personnel collision detection and avoidance devices may be integrated to clothing or other safety devices like the cap lamp. The mine vehicles may also include collision detection and avoidance devices. Such collision detection devices may be integrated or operatively connected to the mine vehicles.

Figure 3:
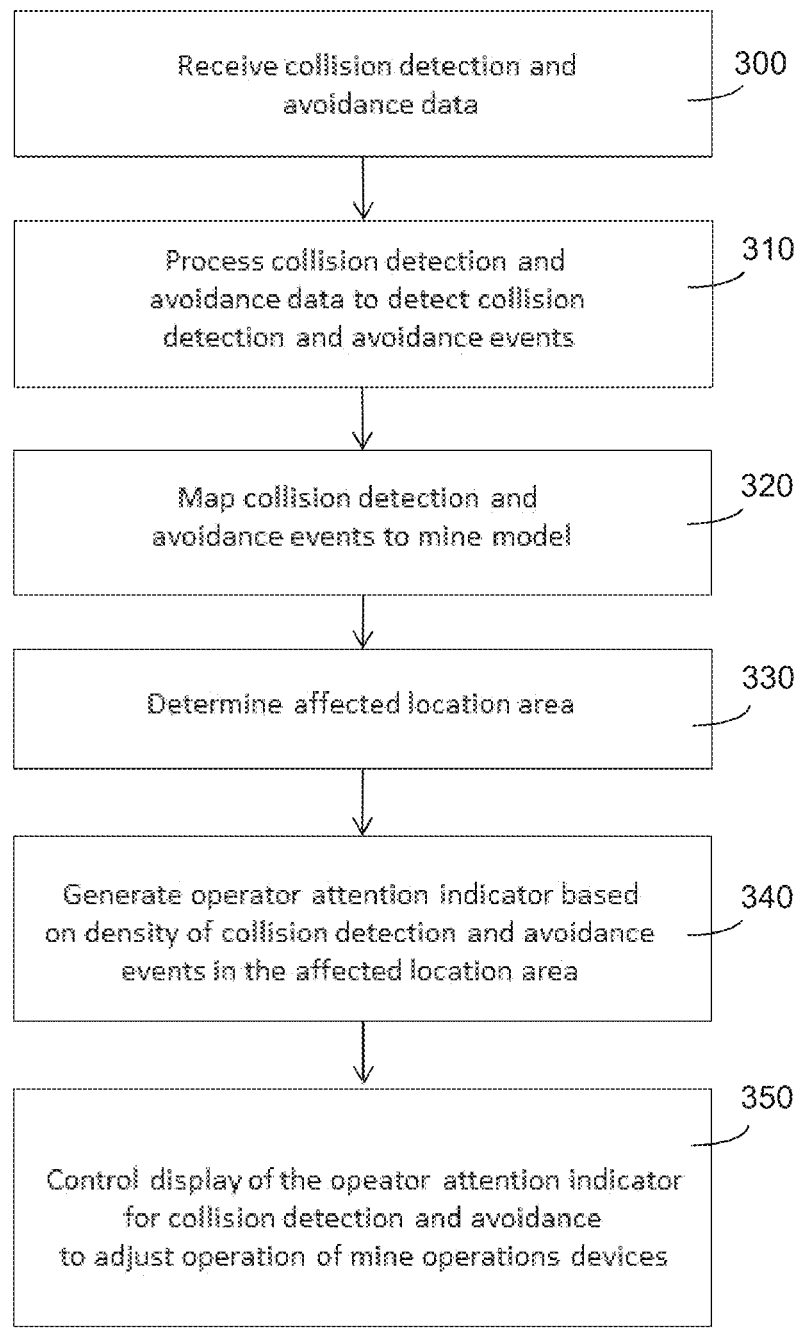
FIGS. 3, 4, 5a and 5b illustrate methods for mine operations.

FIG. 3 illustrates a method for mine operations. The method may be carried out in a mine control system, such as by the DPU 21, and by at least one processing unit therefor, or a personnel or vehicle device.

The method includes receiving at 300 mine operations data from a set of data sources in a mine, the mine operations data comprising sensor data such as collision detection and avoidance data. The mine operations data may include sensor data from mobile work machines and/or from personnel devices. The mine operations data such as collision detection and avoidance data is processed at 310 to detect a set of events meeting at least one operator attention triggering condition. For example, there may be a set of threshold values for associated mine operation data and/or event data types for triggering operation attention. For example, collision detection and avoidance data may indicate that two mine vehicles have come closer to each other than a first threshold distance or than a second threshold distance. Mine operations data or resulting events including value(s) meeting at least one of these threshold values causes an event to be generated or selected for the set. These values may be modified and filtered automatically or based on user input, e.g. to enable the operator to switch between different event and alert attention views.

The set of collision detection and avoidance events is mapped at 320 to a mine model, on the basis of location information associated with each of the events in the set of events. The events may thus be positioned in the model on the basis of associated 2D or 3D coordinates.

An affected location area of the set of events mapped to the mine model is determined 330. For example, block 330 may include determining an affected event location area for each event in the set, and the affected event location areas define or are used to define the affected location area of the set. For example, the affected location area in the mine and mine model may be defined on the basis of predetermined radius around a collision detection and avoidance event. The size of the affected location are may differ e.g. on the basis of identifier and/or severity class of the event. For example, a collision detection and avoidance event that indicates proximity of a vehicle in a distance to another vehicle within a first threshold distance may cause the size of the affected location to be different than a collision detection and avoidance event that indicates proximity of a vehicle to another vehicle within a second threshold distance. For example, a collision detection and avoidance event that indicates proximity of a vehicle in a distance to another vehicle within a first threshold distance may cause the size of the affected location to be larger or smaller than a collision detection and avoidance event that indicates proximity of a vehicle to another vehicle within a second threshold distance. As another example, an emergency collision avoidance event may cause a predetermined size of the affected location. In yet another words, the size of the affected location may depend on the criticality of the collision avoidance and detection event, e.g. on the distance of proximity. For example, an emergency indicated by a mine worker on his/her personnel collision detection and avoidance unit may cause a predetermined size of the affected location.

On the basis of the set of events and the affected location area, an operator attention indicator dependent on density of events in the affected location area is generated 340. This may refer to completely creating the operator attention indicator or selecting the operator attention indicator from a set of available indicators, on the basis of the density of the events. Display of the operator attention indicator is controlled at 350 for the set of events in the affected location area in the mine model to an operator to adjust operation of one or more mine operations devices. The operator attention indicator may also be referred to as an event density indicator.

In response to receiving control input(s) from the operator after block 350, control commands are transmitted to one or more mine operations devices to address the event, e.g. to overcome an alert or underperformance issue. The DPU 21 and a module thereof, such as the CAPM 33, may be configured to receive the user input from the input device 24 and the GUI IF 25, and generate the control commands 28 to associated mine operations device(s) 4-8, 10. After the control commands are executed in the associated mine operations device(s), new mine operations data 26 is received by the DPU 21 and the method of FIG. 3 may be repeated. Then, an updated mining operations status view is displayed to the operator. The earlier displayed operator attention indicator is updated according to the new mine operations data 26, and may be even removed if there are no longer operator attention triggering events.

Thus, the operator can instantly recognize if his corrective actions were enough and provide further control inputs, if appropriate. The presently disclosed features assist the operator to control mine operations devices in mine areas, which may be very complex and extensive. The operator can quickly detect main problematic production areas from less problematic ones and prioritize actions. The present features also enable to improved assistance to the operator to detect existing or prospective bottlenecks and provide instant reactive or proactive action control inputs.

In addition to visualizing operator-attention requiring event clusters based on respective event densities, there are various further actions that may be invoked to assist in the mine operations control on the basis of processing the mine operations data and event density. The DPU 21 may be configured to perform at least some of the further features below, and there may be one or more further modules in the DPU for such features.

At least some events in the set of events are processed to define at least one operator guidance element associated with at least some of the events in the set, to adjust the operation of one or more mine operations devices (associated with the event(s)). The operator guidance element(s) are then displayed for the affected location area. The associated operator guidance element may be displayed in response to detecting a user input for the affected location area, the mine operations device(s) or at least one event associated with the mine operations device(s).

Figure 4:
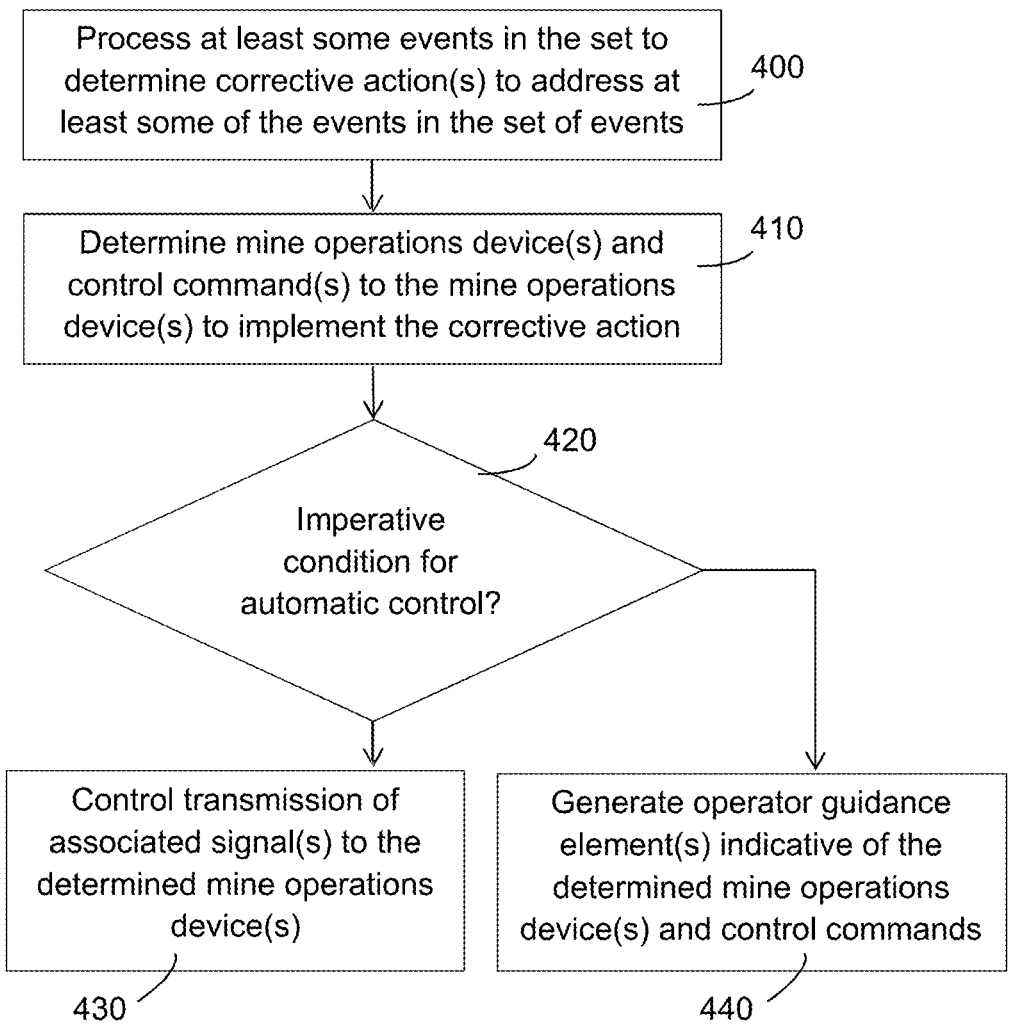

With reference to the method of FIG. 4, at least some events in the set of events may be processed at 400, e.g. by the CAPM 33, to detect at least one corrective action for mine device operations to address the situation caused by the set of events detected in block 310. This may include defining control actions for one or more work machines 4-6 and/or other mine operations devices 10, for example. One or more mine operations devices and one or more control commands associated with the corrective action are determined at 410. Control information for mapping event cause information with one or more operator guidance element and/or the corrective action may be stored in the data storage 22. The control signal and/or contents of the operator guidance element may thus be generated or selected on the basis of the control information. For example, control command(s), guidance information record(s), or data element(s) matching with the mine operations device type and alert identifier or further event charactering information are selected.

Control signal(s) associated with the determined control command(s) and the mine operations device(s) are transmitted at 430, in response to detecting on the basis of processing in block 420 at least some events in the set of events that an imperative condition for automatic control is met. Alternatively, the corrective action(s), and the associated mine operations device(s) and control command(s) may be indicated for the operator, by generating at 440 an operator guidance element. The operator may be provided with an input option, via which the operator may directly trigger the transmission of the determined control signal(s).

The system may be configured to monitor collision detection and avoidance in the mine. There may be allowable distance ranges set for the distance between two mine vehicles or between a vehicle and a person. There may be an event generated when at an affected location a distance between a vehicle and a person is smaller than a first threshold distance, and/or another event may be generated when a distance between a vehicle and a person is smaller than a second threshold distance but larger than the first threshold distance. User guidance element(s) may be displayed for the operator to take action to adapt the speed of vehicles e.g. by setting a speed limit or by causing information to be displayed to personnel in the mine who are at the affected location or approaching the affected location.

The system may be configured to monitor bucket weight of load and haul devices (LHD) in the mine. If the average bucket weight in the mine (or of a give LHD device) is 10, and bucket weight of LHD devices filling their bucket at given loading area is around 6, below a threshold of 7 (or 30% less than average), for example, events are generated for these LHD devices and the associated loading area. User guidance information element(s) may be displayed for the operator to take action to manually control the bucket loading or adapt automatic loading control parameters for the LHD devices, or control command(s) adapting automatic loading control parameters may be defined and sent to the LHD devices.

At least some events in the set of events may be processed to determine if at least one area alarm condition is met. In response to detecting that the at least one area alarm condition is met, the area alarm and/or a safety control action associated with at least the affected area is controlled. For example, automatic drive operations may thus be interrupted at an operation zone comprising the affected area.

Figure 5A:
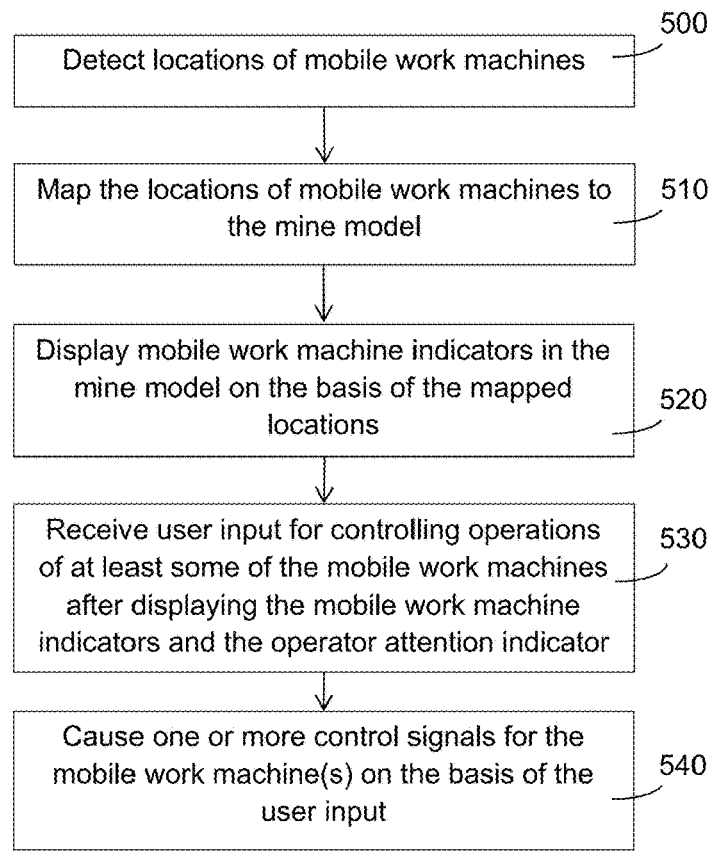

The control system, such as the DPU 21, may be further configured for perform the method of FIG. 5a. Locations of mobile work machines are detected at 500, e.g. based on the received location data 27. Block 500 may be performed for some or all of the work machines 4-6 in the mine 1. The locations of the mobile work machines are mapped at 510 to the mine model. Mobile work machine indicators are displayed at 520 in the mine model on the basis of the mapped locations.

User input is received at 530 for controlling operations of at least some of the mobile work machines after displaying the mobile work machine indicators and the operator attention indicator. Control signals are caused at 540 to the mobile work machine(s) on the basis of the user input. For example, based on collision detection and avoidance events, a speed limit or a deceleration or stop command may be formed and sent to a work machine that is in or near an affected area.

Figure 5B:
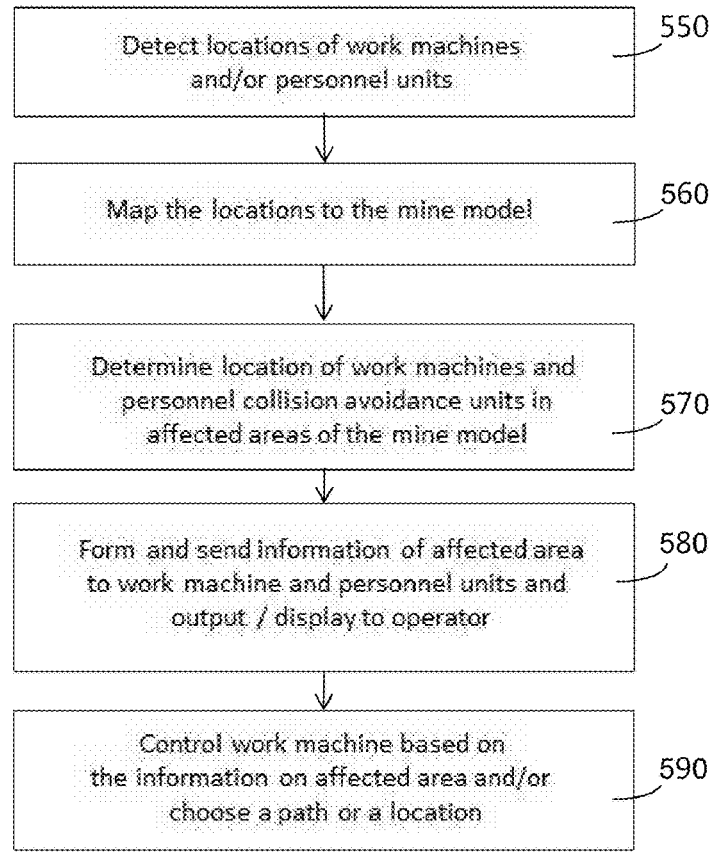

The control system and the devices may be further configured to perform the method of FIG. 5b. The locations of mobile work machines and/or personnel with collision detection and avoidance units are detected at 550, e.g. based on location data 27. Block 500 may be performed by some or all of the work machine and personnel collision detection and avoidance units and/or the control system, separately or acting together. The locations of the mobile work machines and personnel units are mapped at 560 to the mine model. The locations of work machines and personnel collision avoidance units in affected areas of the mine model are determined at 570. Information on being in or approaching an affected area are sent to the corresponding work machines and personnel collision avoidance units and outputted, e.g. displayed to the operators of the devices at 580. The mobile work machine(s) may then be controlled on the basis of user input, and/or a user may select a path or location in the mine accordingly at 590. For example, a work machine may be stopped, or a person may move into a safe location. The output may happen by using a display of the collision detection and avoidance unit or work machine, by audible output, or by other means that an operator can observe.

Event(s) of the set detected in block 310 may be mapped to a location of a mobile work machine on the basis of work machine identification information received with the mine operations data associated with the event(s).

Instead or in addition, events of the set detected in block 310 may be mapped to a mobile work machine or a vehicle collision detection and avoidance unit, or to a personnel collision detection and avoidance unit. Subsequently, the events mapped to the vehicle or vehicle collision detection and avoidance unit or personnel collision detection and avoidance unit may be mapped to the mine model. If the vehicle or vehicle collision detection and avoidance unit or personnel collision detection and avoidance unit moves to a new location, the mapping of events from the vehicle or vehicle collision detection and avoidance unit or personnel collision detection and avoidance unit to the mine model may be carried out again. In other words, the mapping of events to the mine model may change over time.

Mapping to the mine model may happen by using positioning of the vehicle or vehicle collision detection and avoidance unit or personnel collision detection and avoidance unit. Alternatively or in addition, co-location of two or more units may be used for mapping, and/or co-location of a unit in a communications base station range, in a radiofrequency tag range or in another way known area may be used for the mapping.

One or more visualization parameters may be defined for the operator attention indicator in the affected location area on the basis of density of the set of data events and/or a set of parameter values of the set of events in the affected location area. Display of the operator attention indicator is controlled on the basis of the defined at least one visualization parameter in a production status display based on the mine model.

Coloring in the affected location area may be controlled on the basis of density of the set of data events and/or a set of parameter values of the set of events in the affected location area. One or more parameter values of at least one event detected to require operator attention are used as an input parameter set affecting the generation at 340 of the operator attention indicator. According to a method, a parameter value of a data source or a set of data sources is defined. A color associated with a range of values comprising the parameter value is defined for visualization of the data source or the set of data sources data.

One or more further visualization parameters may be defined on the basis of parameter values and/or detected number of events and/or data sources within the affected area or a sub-area of the affected area. Brightness of visualization of the operator attention indicator and/or the affected area may be adapted on the basis of the number of events and/or data sources.

Coloring may be controlled with a first magnitude value within a first radius from a location of an event in the set of events and with a second magnitude within a second radius from the location of the event, wherein the second radius is larger than the first radius and the first magnitude value is larger than the second magnitude value. The first radius may define size of an associated data source. Inside this radius the color or heat of may be applied with full magnitude, and the first radius may also be considered as full magnitude radius or distance. The second radius may define the affected zone of the data source. Outside the second radius, which may also be referred to as falloff distance, the data point has no effect to the mine model. Thus, the operator attention indicator may be generated such that no coloring is applied for indicating operator attention in the affected location area outside the second radius. The affected location area may be dependent on the number of events in the set of events. For example, the first and/or second radius is increased with increase of the events. The affected location area may be dependent on the criticality of events. For example, the first and/or second radius is increased with larger criticality of the event. A collision detection and avoidance event that indicates proximity of a vehicle to another vehicle within a first threshold may cause the size of the affected location to be larger than a collision detection and avoidance event that indicates proximity of a vehicle to another vehicle within a second threshold, and/or an emergency collision avoidance event may cause a large predetermined size of the affected location area.

Each data source may be defined and described as a heat or a light source, which has at least two radius values. For example, the first radius may be in the range of 2 to 15 meters, such as 10 meters, and the second radius in the range of 10 to 30 meters, such as 15 meters. It will be appreciated that also further distances may be applied to control the generation of the operator attention indicator, e.g. one or more intermediate distances between the first radius and the second radius.

The mine model may include three-dimensional (3D) point cloud data for three-dimensional representation of an underground mine, and the operator attention indicator covers at least a portion of 3D representation of tunnel portion associated with the affected area. However, it is to be appreciated that alternatively two-dimensional model may be applied.

In an example embodiment, the operator attention indicator is generated for 3D tunnel representation by a method comprising:
  determining heat values for a tunnel point for each event in the set of events within the second radius from the tunnel point,
  determining a heat sum for the tunnel point by summing the heat values,
  defining color for the tunnel point on the basis of the heat sum, and
  controlling coloring of the tunnel point by the defined color in the three-dimensional representation.

Figure 6:
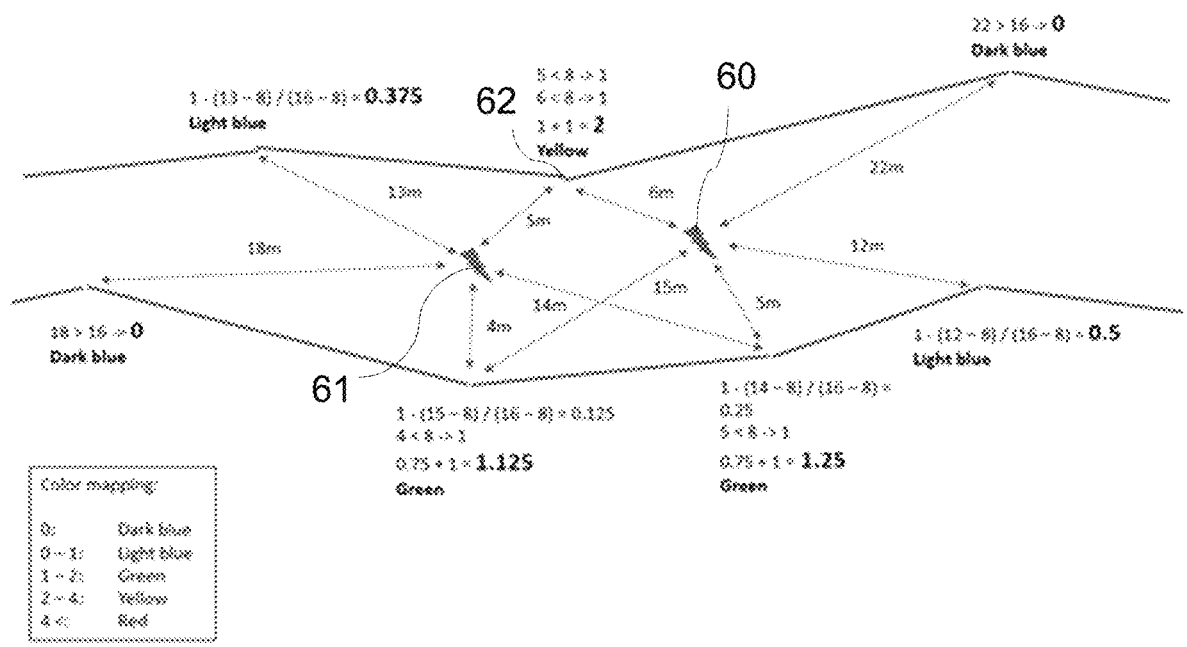
FIG. 6 illustrates a simplified example of density-based definition of display parameters.

In the simplified example illustrated in FIG. 6, two events 60, 61 have occurred inside a tunnel. Distances of the events 60, 61 to nearby tunnel points (at other end points of the arrows) 62 are calculated. If the distance is greater than the selected falloff value, 16 meters in this example, they do not affect the tunnel point heat. If the distance is shorter than the selected full magnitude distance, which is 8 meters in this example, the added heat to the tunnel point is one unit. For example, tunnel point 62 is closer than 8 meters to both events, so it is assigned 1+1=2, which is mapped to yellow. Distances between the full magnitude and the falloff distance may add 0-1 units of heat using a formula:

Heat=(Distance−$m$)/($f$−$m$)

m refers to full magnitude distance and f to falloff distance.

If the model has surfaces, they are colored according to the defined color. In a wireframe model the vertices are colored. In point cloud model individual points are colored.

The color definition may be based on a monochromatic coloring model. The color range is the same or a subset of rainbow colors from violet to red. This model may be used when the data values of the events are not of importance, but the density of events is illustrated, for example alarm locations or areas where the signal values have exceeded a given operator attention triggering threshold value. Areas with no events may have a default color, such as dark grey. Areas with low density of events may be defined as violet or blue, and the areas with high density of events may be defined as red, for example. Various rainbow colors including cyan, green, yellow and orange may be used to describe different mid-level densities.

The color definition may be based on Red Green Blue (RGB) coloring model. This model may be particularly useful when the density of the events is not relevant, but the event data values are more important. In this model each event or data point may be configured to emit light of fixed luminosity, which colors the surrounding mine model. The light can be either monochromatic or any color from the RGB color space. Compared to heatmap coloring, RGB color mode can be applied to visualize the variance and balance of data values of the events. RGB color mode also allows an efficient way to filter events based on the values. Each color channel (red, green and blue) can be defined to include only values from a certain value range. For example, by disabling blue and green color channels the visualization can show the affected areas of high values (red channel) only. The filtering may be controlled in response to user input, for example to further quickly detect where events of particular type occur. The filtering may be controlled based on some other trigger. For example, the display may automatically switch to display between different filtered event views.

The color definition may be based on RGB model with variable brightness, wherein there is an addition brightness calculation to describe the density of events. The model combines the density visualization with the value information visualization. Areas of high density may be assigned with bright colors and areas with low density may be assigned with darker colors, while the hue of the color is affected by the data values only.

It will be appreciated that in addition or instead of the above examples, also other visualization parameters may be adapted on the basis of density and/or parameter values of the data events in the affected location areas. For example, reflection or transparency and/or glow maybe controlled.

Figure 7A:
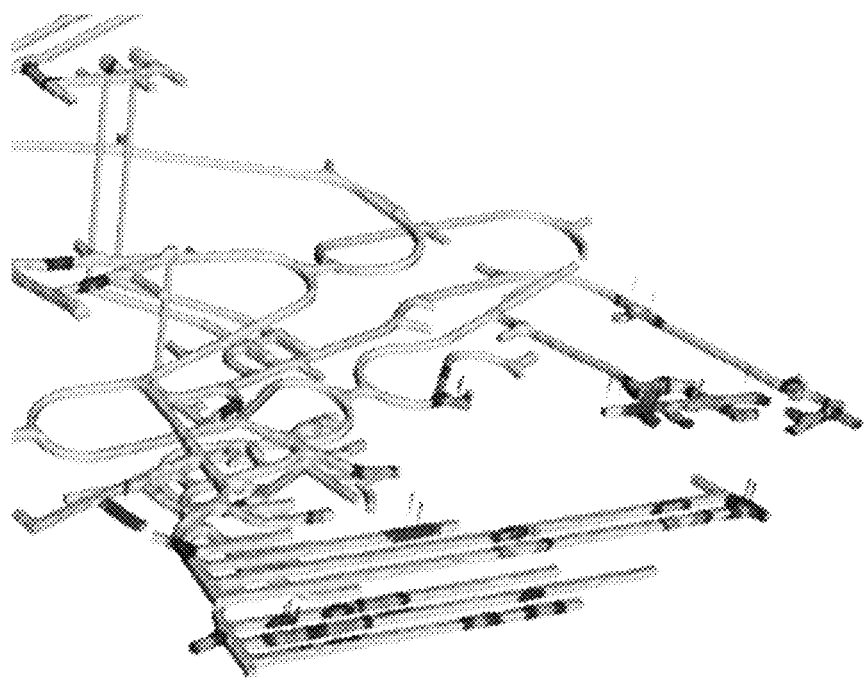
FIGS. 7a and 7b illustrate example display views.
Figure 7B:
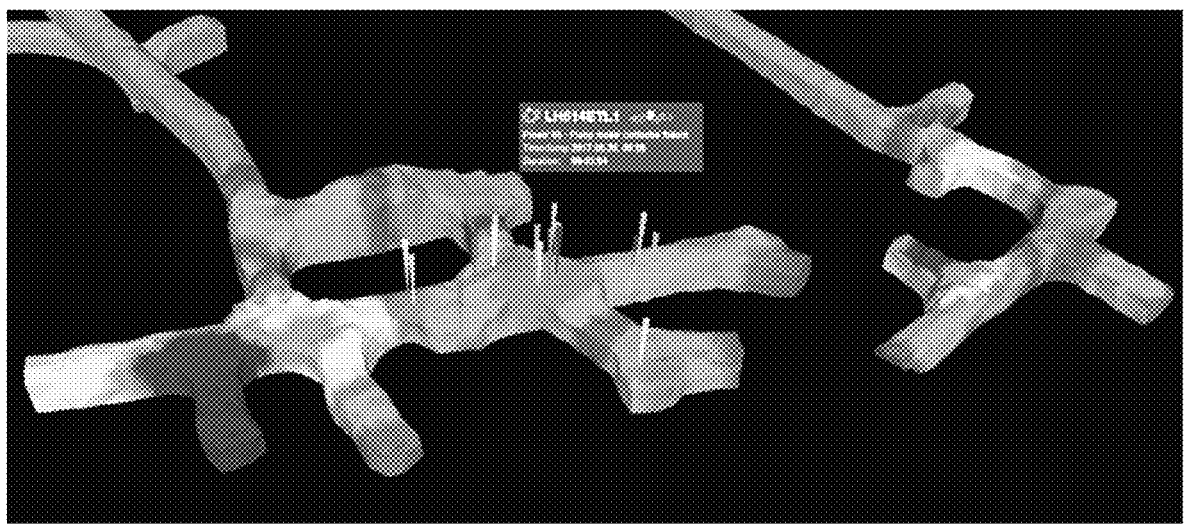

FIGS. 7*a* and 7*b* illustrate example views of 3D tunnel views of view portions. Different colors, or as in the examples, darker areas illustrate the affected areas in the tunnel system. Further information and/or indicators may be provided in the operator guidance element and/or in other view elements. For example, the poles in FIG. 7*b* may illustrate individual event and further information windows (one illustrated) including event information and/or guidance information may be displayed. Such further window may be displayed automatically or in response to user input for an associated event.

Event information based on processing in block 310 may be stored for later processing, such as for subsequent production efficiency or incident inspection analysis of the mine operations. Event status(es) may be reviewed at desired time instants or time ranges. The operator attention indicator, or other indicators based on density of events in affected location area(s) are updated according to event information at the respective time instants or ranges. The event information may be retrieved from the data storage 22 or generated for the review based on mine operations data the occurred production.

An indication of operator-selected time instant or time range may be received. Time stamps of the events are processed to detect a set of events matching with the user-selected time instant or time range, and the operator attention indicator is then generated on the basis of the set of events. Thus, the time instant or range information may be input to block 310 and processing of the time stamps may be part of block 310.

Block 310 may also include prediction of the collision detection and avoidance events from sparse data, the mine model, information on the vehicles, vehicle driving paths and personnel trajectories in the mine, as well as other information. Such prediction may happen by way of machine learning and/or artificial intelligence from existing collision detection and avoidance data and other mine operations data. That is, collision detection and avoidance events may be generated from machine-learned or artificial intelligence models, and the density may thus be partially or wholly based on predicted collision detection and avoidance event information.

It is to be appreciated that various further features may be complement or differentiate at least some of the above-illustrated examples. For example, there may be further user interaction and/or automation functionality further assisting the operator to control various mine devices and operations/settings thereof.

It is also to be appreciated that features may be carried out at the control system, a work machine or a work machine collision detection and avoidance unit and/or a personnel collision detection and avoidance unit. For example, information may be displayed or otherwise outputted (e.g. by sound) to the operator of the mine system, to mine workers through their personnel units and/or to work machine operators through the work machine user interface or a work machine collision detection and avoidance unit.

Figure 8:
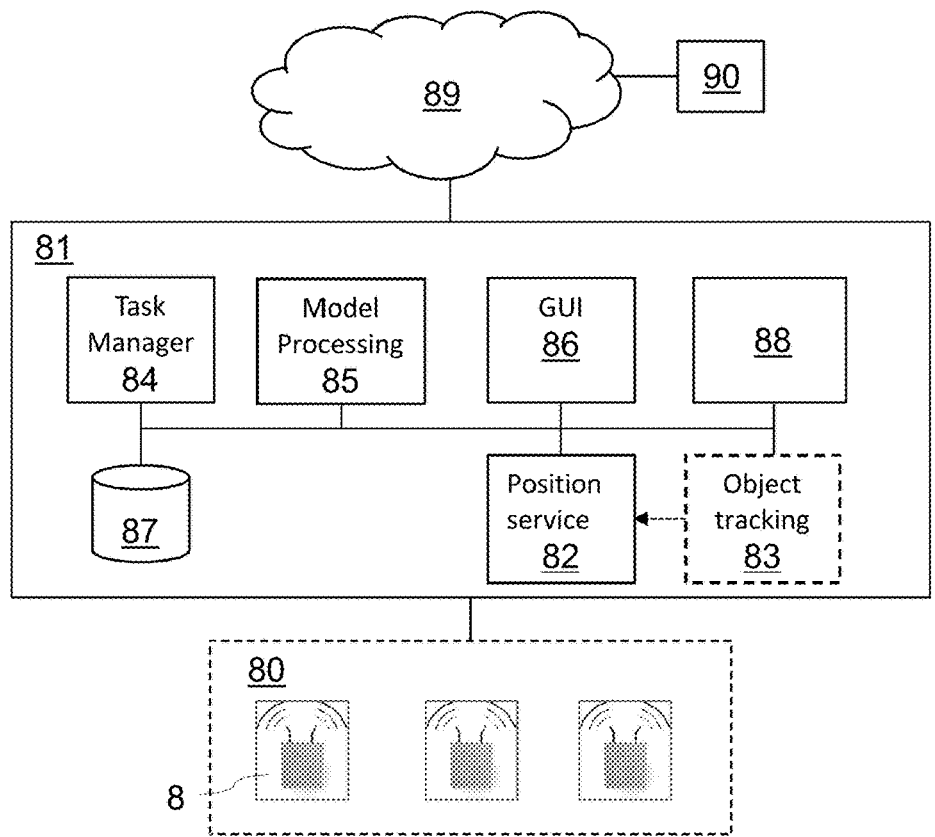
FIG. 8 illustrates an example system for mine operations.

FIG. 8 illustrates operational modules of a mine operations control apparatus or system, such as a server 81. An object tracking module 83 may be configured track location of mobile objects and to provide 3D position indicator to further modules, a position service module 82.

The server 81 may include a task manager or management module 84, which is configured to manage at least some operations at the worksite. For example, the task manager may be configured to assign work tasks for a fleet of work machines and update, send control signals to the work machines, and/or monitor work machine task performance and status, which is indicated at a task management graphical user interface (GUI).

The server 81 may include a model processing module 85, which may maintain one or more models of the underground worksite, such as the 3D mine model. The model processing module 85 may be configured to map the events to the mine model.

The server 81 may include a GUI module 86, which is configured to generate at least some display views for an operator (locally and/or remotely). The GUI module 86 may be configured to generate, on the basis of the 3D model or floor model, a 3D (and/or 2D) view comprising current positions of the mobile objects and the operator attention indicators by applying at least some of the above illustrated examples.

The server 81 may include further module(s) 88, such as a remote monitoring process and UI, an event processing module configured to process the mine operations data to carry out least some functions illustrated above, and/or a cloud dispatcher component configured to provide selected worksite information, such as the mobile object position information to a cloud service.

The system and server 81 may be connected to a further system 90 and/or network 89, such a worksite management system, a cloud service, an intermediate communications network, such as the internet, etc. The system may further include or be connected to a further device or control unit, such as a user unit like a collision detection and avoidance unit, a vehicle unit like a collision detection and avoidance unit, a worksite management device/system, a remote control and/or monitoring device/system, data analytics device/system, sensor system/device, etc.

The object tracking 83 may be implemented as part of another module, such as the position service module 82. The position service 82 is configured to provide, upon request or by push transmission, mobile object position information obtained from or generated on the basis of information from the object tracking 83 for relevant other modules or functions, such as the database 87, the visualizer graphical user interface 86, and/or remote units or systems 70 via one or more networks 89. In the example of FIG. 8 the modules are illustrated as inter-connected, but it is to be appreciated that not all modules need to be connectable.

The system may include or be connected to a control unit or module of a work machine or another mine operations device for which e.g. control commands may be transmitted. The control unit may be provided in each autonomously operating vehicle and be configured to control at least some autonomous operations of the vehicle on the basis of the received control commands An electronic device including electronic circuitries may be an apparatus for realizing at least some embodiments of the present invention, such as the method illustrated in connection with FIG. 3. The apparatus may be included in at least one computing device connected to or integrated into a mine control system.

Figure 9:
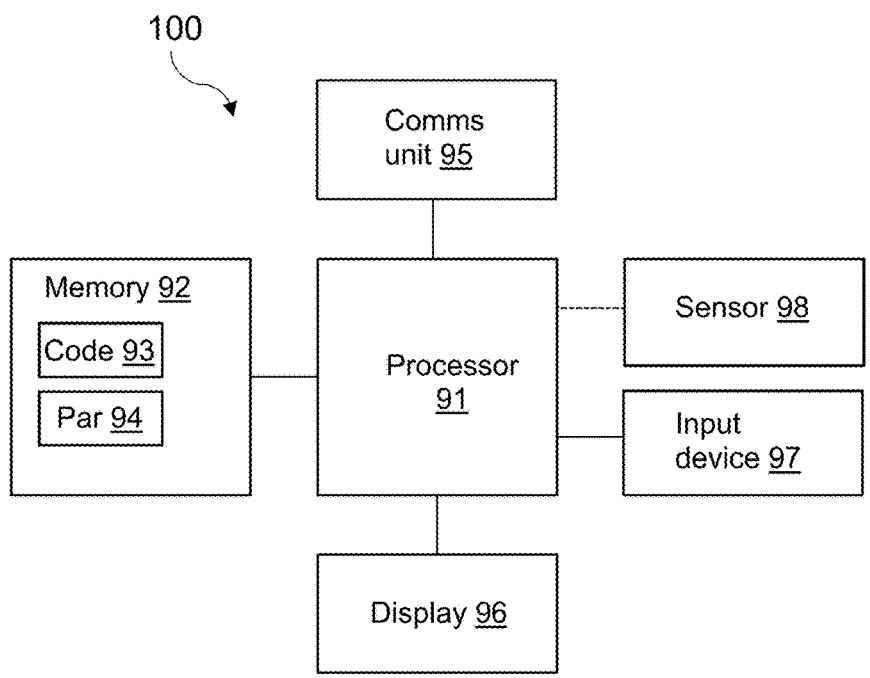
FIG. 9 illustrates an example apparatus capable of supporting mine operations.

FIG. 9 illustrates an example apparatus. Illustrated is a device 100, which may be configured to carry out mine operations analytics and control illustrated above. The device 100 may include or implement the server 81 and/or the DPU 21.

Included in the device 100 is a processor 91, which may include, for example, a single- or multi-core processor. The processor 91 may include more than one processor. The processor may include at least one application-specific integrated circuit, ASIC. The processor may include at least one field-programmable gate array, FPGA. The processor may be configured, at least in part by computer instructions, to perform actions.

The device 100 may include memory 92. The memory may include random-access memory and/or permanent memory. The memory may be at least in part accessible to the processor 91. The memory may be at least in part included in the processor 91. The memory may be at least in part external to the device 100 but accessible to the device. The memory 92 may be means for storing information, such as parameters 94 affecting operations of the device. The parameter information in particular may include parameter information affecting e.g. the floor model generation and application, such as threshold values.

The memory 92 may include computer program code 93 including computer instructions that the processor 91 is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The processor may, together with the memory and computer program code, form means for performing at least some of the above-illustrated method steps in the device. The computer instructions may be implemented as an executable program or as source code. The computer instructions may form a program that can be run on an operating system. The computer instructions may be formed into an installation package for installing the program on a computer. The computer instructions may be formed into a virtualization package, for example a so-called docker package, for executing on a computer. The computer program may be stored on a non-transitory computer-readable medium such as a data disc or a portable memory device, or in a cloud, or as described, stored in the memory of a computer.

The device 100 may include a communications unit 95 comprising a transmitter and/or a receiver. The transmitter and the receiver may be configured to transmit and receive, respectively, i.a. mine operations data and control commands in accordance with at least one cellular or non-cellular standard. The transmitter and/or receiver may be configured to operate in accordance with global system for mobile communication, GSM, wideband code division multiple access, WCDMA, long term evolution, LTE, 3GPP new radio access technology (N-RAT), wireless local area network, WLAN, Ethernet and/or worldwide interoperability for microwave access, WiMAX, standards, for example. The device 100 may include a near-field communication, NFC, transceiver. The NFC transceiver may support at least one NFC technology, such as NFC, Bluetooth, or similar technologies.

The device 100 may include or be connected to a UI. The UI may include at least one of a display 96, a speaker, an input device 97 such as a keyboard, a joystick, a touchscreen, and/or a microphone. The UI may be configured to display views on the basis of the worksite model(s) and the mobile object position indicators. A user may operate the device and control at least some features of a control system, such as the system illustrated in FIG. 6. The user may control a vehicle 4-7 and/or the server via the UI, for example to change operation mode, change display views, modify parameters 94 in response to user authentication and adequate rights associated with the user, etc.

The device 100 may further include and/or be connected to further units, devices and systems, such as one or more sensor devices 98 sensing environment of the device 90. The sensor device may include an IMU or another type of sensor device configured to determine movements of a mobile object.

The processor 91, the memory 92, the communications unit 95 and the UI may be interconnected by electrical leads internal to the device 100 in a multitude of different ways. For example, each of the aforementioned devices may be separately connected to a master bus internal to the device, to allow for the devices to exchange information. However, as the skilled person will appreciate, this is only one example and various ways of interconnecting at least two of the aforementioned devices may be selected without departing from the scope of the present invention.

It is to be understood that the embodiments are not limited to the particular structures, process steps, or materials disclosed herein, but are extended to equivalents thereof as would be recognized by those ordinarily skilled in the relevant arts. It should also be understood that terminology employed herein is used for the purpose of describing particular examples only and is not intended to be limiting.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various examples may be referred to herein along with alternatives for the various components thereof. It is understood that such examples and alternatives are not to be construed as de facto equivalents of one another, but are to be considered as separate and autonomous representations of the present disclosure.

Furthermore, the described features, structures, or characteristics may be combined in any suitable manner In the preceding description, numerous specific details are provided, such as examples of lengths, widths, shapes, etc., to provide a thorough understanding of the present disclosure. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

While the forgoing examples are illustrative of the principles in one or more particular applications, it will be apparent to those of ordinary skill in the art that numerous modifications in form, usage and details of implementation can be made without the exercise of inventive faculty, and without departing from the principles and concepts of the present disclosure. Accordingly, it is not intended that the present disclosure be limited, except as by the claims set forth below.

What is claimed is:

1. A collision detection and avoidance system for a mine, comprising at least one processor and at least one memory including computer program code stored on a non-transitory computer-readable medium, the at least one memory and the computer program code configured to, when executed by the at least one processor, cause the apparatus at least to:

receive mine operations data from a set of data sources in the mine, the mine operations data including collision detection and avoidance data related to mining vehicles;

process the mine operations data to detect a set of collision detection and avoidance events meeting at least one operator attention triggering condition;

map the set of collision detection and avoidance events to a mine model on the basis of location information associated with the collision detection and avoidance events in the set of collision detection and avoidance events;

determine an affected location area of the set of collision detection and avoidance events mapped to the mine model, the affected location area of the set being defined on the basis of a predetermined radius around each collision detection and avoidance event in the set of collision detection and avoidance events, wherein a size of the affected location area depends on criticality of the collision detection and avoidance events;

generate, on the basis of the set of collision detection and avoidance events and the affected location area, an operator attention indicator dependent on density of collision detection and avoidance events in the affected location area;

control colouring in the affected location area based on the density of the set of collision detection and avoidance events;

control a display of the operator attention indicator for the set of collision detection and avoidance events in the affected location area in the mine model to an operator to adjust operation of one or more mine operations devices; and control operations of at least some of the mining vehicle based on an operator input that is based on displaying the operator attention indicator.

2. The system of claim 1, wherein the operation attention indicator is arranged to be generated based on criticalities of collision detection and avoidance events in the affected location area.

3. The system of claim 1, wherein the operation attention indicator is arranged to be generated based on distances of proximity of collision detection and avoidance events in the affected location area.

4. The system of claim 1, wherein the at least one memory and the computer program code are further configured-to, with the at least one processor, cause the system to:
process at least some events in the set of collision detection and avoidance events to define at least one associated operator guidance element to adjust the operation of the one or more mine operations devices; and
control display of the at least one associated operator guidance element for the affected location area.

5. The system of claim 1, wherein the at least one memory and the computer program code are further configured-to, with the at least one processor, cause the system to:
receive location data related to a collision detection and avoidance unit; and
cause display of at least one operator guidance element associated with at least some of the events in the set of events in response to determining that the collision detection and avoidance unit is in the affected location area.

6. The system of claim 1, wherein the at least one memory and the computer program code are further configured-to, with the at least one processor, cause the system to:
receive location data related to a collision detection and avoidance unit; and
cause output by a collision detection and avoidance unit of at least one operator guidance element associated with at least some of the events in the set of events in response to determining that the collision detection and avoidance unit is in the affected location area.

7. The system of claim 1, wherein the at least one memory and the computer program code are further configured-to, with the at least one processor, cause the system to:
process at least some events in the set of collision detection and avoidance events by a corrective action module to detect at least one corrective action to address at least some of events in the set of collision detection and avoidance events;
receive location data related to one or more mine operations devices,
determine for the one or more mine operations devices one or more control commands associated with the corrective action; and
cause transmission of control signals associated with the one or more control commands to the determined one or more mine operations devices in response to detecting an imperative condition for automatic control, or generate an operator guidance element indicative of the determined one or more mine operations devices and the one or more control commands.

8. The system of claim 1, wherein the mine operations data comprises sensor data from mobile work machines, and the at least one memory and the computer program code are further configured-to, with the at least one processor, cause the system to:
detect locations of mobile work machines;
map the locations of mobile work machines to the mine model;
display mobile work machine indicators in the mine model on the basis of the mapped locations;
receive operator input for controlling operations of at least some of the mobile work machines after displaying the mobile work machine indicators and the operator attention indicator; and
cause one or more control signals for the at least some of the mobile work machines on the basis of the operator input.

9. The system of claim 1, wherein the at least one memory and the computer program code are further configured-to, with the at least one processor, cause the system to control the work machine by one or more of the following: setting a speed limit, causing deceleration and stopping the work machine.

10. The system of claim 1, wherein the at least one memory and the computer program code are further configured-to, with the at least one processor, cause the system to map one or more events of the set of events to a mobile work machine and subsequently to a location in the mine model on the basis of work machine identification information received with mine operations data associated with the one or more events.

11. The system of claim 1, wherein the at least one memory and the computer program code are further configured-to, with the at least one processor, cause the system to:
define at least one visualization parameter for the operator attention indicator in the affected location area on the basis of density of the set of data events and/or a set of parameter values of the set of events in the affected location area; and
control display of the operator attention indicator on the basis of the defined at least one visualization parameter in a production status display based on the mine model.

12. The system of claim 1, wherein the mine model includes three-dimensional point cloud data for three-dimensional representation of an underground mine, and the operator attention indicator covers at least a portion of three-dimensional representation of tunnel portion associated with the affected area.

13. A computer program product comprising a non-transitory computer-readable storage medium including instructions, which, when executed on a computer, performs a method according to claim 1.

14. A method performed by an apparatus comprising at least one processor and at least one memory including computer program code stored on a non-transitory computer-readable medium, the at least one memory and the computer program code configured to, when executed by the at least one processor, cause the apparatus to perform a method for detecting and avoiding a collision, the method comprising the steps of:
receiving mine operations data from a set of data sources in a mine, the mine operations data including collision detection and avoidance data related to mining vehicles;

processing the mine operations data to detect a set of collision detection and avoidance events meeting at least one operator attention triggering condition;

mapping the set of collision detection and avoidance events to a mine model on the basis of location information associated with the events in the set of collision detection and avoidance events;

determining an affected location area of the set of collision detection and avoidance events mapped to the mine model, the affected location area of the set being defined on the basis of a predetermined radius around each collision detection and avoidance event in the set of collision detection and avoidance events, wherein a size of the affected location area depends on criticality of the collision detection and avoidance events;

generating, on the basis of the set of events and the affected location area, an operator attention indicator dependent on density of collision detection and avoidance events in the affected location area;

controlling colouring in the affected location area based on the density of the set of collision detection and avoidance events;

controlling display of the operator attention indicator for the set of collision detection and avoidance events in the affected location area in the mine model to an operator to adjust operation of one or more mine operations devices; and controlling operations of at least some of the mining vehicle based on an operator input that is based on displaying the operator attention indicator.

15. The method of claim 14, further comprising the step of generating the operation attention indicator is based on criticalities or distances of proximity of collision detection and avoidance events in the affected location area.

\* \* \* \* \*